(12) United States Patent
Bercher

(10) Patent No.: US 12,510,768 B2
(45) Date of Patent: Dec. 30, 2025

(54) METHOD FOR OPTIMIZING A GEOMETRICAL PARAMETER OF A SEMI-FINISHED OPTICAL LENS

(71) Applicant: ESSILOR INTERNATIONAL, Charenton-le-Pont (FR)

(72) Inventor: Pierre Bercher, Sucy en Brie (FR)

(73) Assignee: Essilor International, Charenton-le-pont (FR)

( * ) Notice: Subject to any disclaimer, the term of this patent is extended or adjusted under 35 U.S.C. 154(b) by 396 days.

(21) Appl. No.: 18/128,597

(22) Filed: Mar. 30, 2023

(65) Prior Publication Data
US 2023/0350227 A1    Nov. 2, 2023

(30) Foreign Application Priority Data

Mar. 31, 2022  (EP) .................................. 22305426

(51) Int. Cl.
*G02C 7/02*          (2006.01)
(52) U.S. Cl.
CPC .................................. *G02C 7/027* (2013.01)
(58) Field of Classification Search
CPC ........ B29D 11/00326; B29D 11/00317; B29D 11/00009; G02C 7/068; G02C 7/028; G02C 7/02; G02C 7/027; G02C 7/024; G02C 7/08
USPC ....... 351/159.73–159.77, 178, 159
See application file for complete search history.

(56) References Cited

U.S. PATENT DOCUMENTS

2017/0108709 A1\* 4/2017 Woodland ............... G02C 7/027
2023/0305316 A1\* 9/2023 Heslouis ................. G02C 7/028

FOREIGN PATENT DOCUMENTS

JP    2007-240553 A    9/2007
WO    2015/147777 A1   10/2015

OTHER PUBLICATIONS

Extended European Search Report issued in European Patent Application No. 22305426.3 dated Sep. 23, 2022.

\* cited by examiner

*Primary Examiner* — Travis S Fissel
(74) *Attorney, Agent, or Firm* — NIXON & VANDERHYE

(57) ABSTRACT

Disclosed is a method for optimizing a geometrical parameter of at least one semi-finished optical lens in a set of such lenses having a designated lens material, the semi-finished optical lens to be optimized has a designated base curve and an initially determined geometry allowing manufacturing finished ophthalmic lenses for an initial set of ophthalmic parameters, the method including: providing order proportion data reflecting each ophthalmic prescription in the initial set; providing a desired proportion selection rate; determining a subset of ophthalmic parameters in the initial set corresponding to the desired proportion selection rate; determining the optimized value of a geometrical parameter of an optimized semi-finished optical lens having the designated base curve and lens material and allows manufacturing finished ophthalmic lenses for each ophthalmic prescriptions in the subset of ophthalmic parameters; outputting the determined optimized value as the optimized geometrical parameter of said semi-finished optical lens.

20 Claims, 3 Drawing Sheets

METHOD FOR OPTIMIZING A GEOMETRICAL PARAMETER OF A SEMI-FINISHED OPTICAL LENS

This application claims the priority under 35 USC 119(a) of European patent application 22305426.3 filed on Mar. 31, 2022, the entirety of which is incorporated herein by reference.

BACKGROUND OF THE INVENTION

Field of the Invention

The disclosure relates to a method, for example implemented by computer means, for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters.

The disclosure further relates to a data processing device for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters.

Field of the Invention

The discussion of the background of the disclosure herein is included to explain the context of the disclosure.

An optical lens is generally manufactured in accordance with a wearer specification. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens is taken into account. At least one of the surfaces of the ophthalmic lens is processed to provide an ophthalmic lens according to the wearer prescription. The contour of the ophthalmic lens is edged according to the shape of the rim of the spectacle frame on which the ophthalmic lens is to be mounted.

An optical lens is generally manufactured from a semi-finished optical lens. A semi-finished optical lens generally has two opposite surfaces at least one of which is unfinished.

Generally, a lens manufacturer receives a lens order comprising prescription data for a wearer. Based on the prescription data the lens manufacturer selects for a set of semi-finished optical lenses a semi-finished optical lens for further grinding and polishing to produce a lens that fits the lens wearer's prescription.

The set of semi-finished optical lenses is made from a designated lens material with a designated refractive index, for example 1.56, and each of the semi-finished optical lenses has a determined geometry determined to allow manufacture of the finished optical lenses for substantially all ophthalmic lens prescriptions. The base curves, of the semi-finished optical lenses, provide surface power for the first side curve (e.g. front) which, when combined with the second side curve (e.g. back, facing a wearer's eye), after it is ground and polished, produces in worn conditions the desired dioptric function to the wearer' eyes.

For example, a lens manufacturer produces a set of twenty different semi-finished optical lenses each of which have different base curves. Accordingly, each of the semi-finished optical lenses in the set, also referred to as blanks or pucks, satisfy a subset of wearer and/or frame data to produce suitable finished optical lenses.

As described, the geometries of each of the lenses in the existing exemplary set of semi-finished optical lenses are determined to allow for an extensive range of ophthalmic prescriptions to be assigned to each base curve produced. In other words, each semi-finished optical lens in the set of semi-finished optical lenses is designed to have a geometry that is large enough in thickness and diameter to allow for manufacture of substantially all prescriptions that are assigned to said semi-finished optical lens. To do so, thick and large diameter semi-finished optical lenses are produced to suit all prescriptions and frame sizes which include some rare prescriptions that lie far outside the norm for common prescriptions.

Unfortunately, for common prescriptions that do not require such a thick and large semi-finished optical lens, there is significant waste in lens material during the griding, polishing and edging steps.

It is therefore an aim of the present disclosure to provide a method of optimizing a geometrical parameter of at least one semi-finished optical lens in a set of semifinished ophthalmic lenses to, for example, minimize optical lens material wastage at least for the most frequent ophthalmic prescriptions and/or spectacle frames.

SUMMARY OF THE INVENTION

To this end, the disclosure proposes a method, for example implemented by computer means, for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters, the method including:

providing order proportion data indicative of the proportion of each ophthalmic prescription in the initial set of ophthalmic parameters, providing a desired proportion selection rate, determining a subset of ophthalmic parameters included in the initial set of ophthalmic parameters that corresponds to the provided desired proportion selection rate based on the order proportion data, determining the optimized value of at least one geometrical parameter of an optimized semi-finished optical lens, the optimized semi-finished optical lens having the designated base curve and the designated lens material and allows manufacturing finished ophthalmic lenses for each ophthalmic prescriptions comprised in the subset of ophthalmic parameters, outputting the determined optimized value of the least one geometrical parameter of the optimized semi-finished optical lens as the optimized geometrical parameter of said semi-finished optical lens.

The semi-finished lens to be optimized is a model of semi-finished lens to be redefined in order to reduce waste when manufacturing ophthalmic lenses.

Advantageously, the method according to the disclosure allows providing an optimized set of semi-finished optical lens that allows manufacturing all of the optical lenses corresponding to the each ophthalmic prescriptions comprised in the subset of ophthalmic prescription and may be optimized in terms of number of different lens blanks and/or price of the different optical lens blanks and/or amount of material to be removed from the semi-finished optical lens blanks to manufacture the optical lenses.

In other words, unlike what was done up to now, the method of the disclosure allows optimizing a geometrical parameter of a semi-finished optical lens while allowing to manufacture finished ophthalmic lenses for each ophthalmic prescriptions comprised in the subset of ophthalmic parameters corresponding to a desired selection rate.

According to further embodiments which can be considered alone or in combination:
- each lens, for example at least two lenses, of the set of semi-finished optical lenses have:
  - a different diameter, and/or
  - a different thickness at the center of the semi-finished optical lens, and/or
  - a different thickness at the periphery of the semi-finished optical lens, and/or
  - a different shape of the back surface of the semi-finished optical lens, for example the curvature of the back surface of the semi-finished optical lens; and/or
- the different lenses of the set of semi-finished optical lens have different thickness at the center and/or at the periphery of the lens; and/or
- the number of different semi-finished optical lenses in the set of semi-finished optical lenses is determined based on the number of lenses ordered to the lens manufacturer; and/or
- the number of different semi-finished optical lenses in the set of semi-finished lenses is limited, for example to three different semi-finished optical lenses; and/or
- the number of different semi-finished optical lenses is obtained according to previously manufactured optical lenses or to new type of optical lenses the manufacturer may have to manufacture; and/or
- the optimization of the at least one semi-finished optical lens is obtained according to previously manufactured optical lenses or to new type of optical lenses the manufacturer may have to manufacture; and/or
- the order proportion data indicative of the proportion of each ophthalmic prescription is based on the optical lenses ordered to a lens manufacturer over a past period of time, for example between one month and one year before the optimization, for example corresponds to at least the last 500 ophthalmic lenses ordered, for example corresponds to at least the last 1000 ophthalmic lenses, for example corresponds to at least the last 10000 ophthalmic lenses; and/or
- the determination of the optimized value of at least one geometrical parameter of an optimized semi-finished optical lens comprises determining, for example calculating, a global cost function comprising:
  - a supply cost function,
  - a semi-finished optical lens cost function, and
  - a material cost function; and/or
- the optimized semi-finished optical lens has an overall volume smaller than the overall volume of the semi-finished optical lens to be optimized; and/or
- compared to the semi-finished lens from which it is determined, the optimized lens has the same base curve and has at least a different parameter comprising central thickness, periphery thickness, curvature of the rear face, diameter; and/or,
- the initial set of ophthalmic parameters and subset of ophthalmic parameters comprise a set of discrete values of prescription parameters and for each prescription parameter the initial set comprises all the discrete values comprised between two extreme values, for example sphere and cylinder and/or sphere and cylinder and diameter; and/or
- the set of discrete values of prescription parameters have an increment greater than or equal to 0.05 diopter, for example greater than or equal to 0.1 diopter, and smaller than or equal to 0.5 diopter, for example smaller than or equal to 0.25 diopter; and/or
- the initial set of ophthalmic parameters comprises at least a plurality of ophthalmic prescriptions with a cylinder smaller than or equal to 0.1 diopter in absolute value, for example equal to 0 diopter; and/or
- the subset of ophthalmic parameters comprises at least a plurality of ophthalmic prescriptions with a cylinder smaller than or equal to 0.1 diopter in absolute value, for example equal to 0 diopter; and/or
- the subset of ophthalmic parameters corresponds to a uniform scaling transformation of the initial set of ophthalmic parameters in a two-dimensions representation of the ophthalmic prescription parameters, for example a sphere and cylinder representation; and/or
- the geometrical parameter is at least one of:
  - the diameter of the semi-finished optical lens,
  - the thickness at the center of the semi-finished optical lens,
  - the thickness at the periphery of the semi-finished optical lens,
  - the shape of the back surface of the semi-finished optical lens, for example the curvature of the back surface of the semi-finished optical lens; and/or
- the desired proportion selection rate is greater than or equal to 50%, for example greater than or equal to 60% and smaller than or equal to 95%, for example smaller than or equal to 80%; and/or
- upon determining a subset of ophthalmic parameters that corresponds to the provided desired proportion selection rate, the smallest subset of ophthalmic parameters is determined; and/or
- the steps of determining a subset of ophthalmic parameters and determining the optimized value of at least one geometrical parameter are repeated so as to determine the subset of ophthalmic parameters that allows an optimized semi-finished optical lens having the smallest overall volume; and/or
- after having determined the optimized semi-finished optical lens an effective proportion selection rate for said optimized semi-finished optical lens is determined based on the provided order proportion data,
- the effective proportion selection rate is compared to the provided desired proportion selection rate, and
- the steps of determining a subset of ophthalmic parameters and determining the optimized value of at least one geometrical parameter are repeated using a smaller desired proportion selection rate.

The disclosure also relates to a method, for example implemented by computer means, for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters, wherein the method includes repeating the steps of the method according to the disclosure with a different desired proportion selection rate, where at each repetition the difference in volume of the optimized semi-finished optical lens and the initial semi-finished optical lens is determined and the method further comprises determined the proportion rate and optimized semi-finished optical lens that provide the greatest difference in volume.

The disclosure also relates to a data processing device comprising a processor configured to perform the steps of at least one method of the disclosure.

For example, the disclosure relates to a data processing device for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters, wherein the device comprises at least one input configured for:
  obtaining order proportion data indicative of the proportion of each ophthalmic prescription in the initial set of ophthalmic parameters,
  obtaining a desired proportion selection rate,
  at least one processor configured for:
  determining a subset of ophthalmic parameters included in the initial set of ophthalmic parameters that corresponds to the provided desired proportion selection rate based on the order proportion data,
  determining the optimized value of at least one geometrical parameter of an optimized semi-finished optical lens, the optimized semi-finished optical lens having the designated base curve and lens material and allows manufacturing finished ophthalmic lenses for each ophthalmic prescriptions comprised in the subset of ophthalmic parameters, wherein the optimized semi-finished optical lens has an overall volume smaller than the overall volume of the semi-finished optical lens to be optimized,
  at least an output configured for:
  outputting the determined optimized value of the least one geometrical parameter of the optimized semi-finished optical lens as the optimized geometrical parameter of said semi-finished optical lens.

According to a further aspect, the disclosure relates to a computer program product comprising one or more stored sequence of instruction that is accessible to a processor and which, when executed by the processor, causes the processor to carry out the steps of at least one method according to the disclosure.

According to another aspect the disclosure relates to a program which makes a computer execute at least one method of the disclosure.

The disclosure also relates to a computer readable medium carrying one or more sequences of instructions of the computer program according to the disclosure.

The disclosure further relates to a computer-readable storage medium having a program recorded thereon; where the program makes the computer execute at least one method of the disclosure.

The disclosure relates to a device comprising a processor adapted to store one or more sequence of instructions and to carry out at least one of the steps of at least one method according to the disclosure.

BRIEF DESCRIPTION OF THE DRAWINGS

Non limiting embodiments of the disclosure will now be described with reference to the accompanying drawing wherein.

Figure 1:
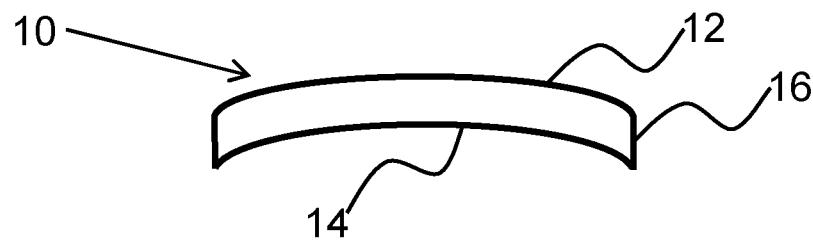
FIG. 1 illustrates an optical lens to be manufactured.

Elements in the figures are illustrated for simplicity and clarity and have not necessarily been drawn to scale. For example, the dimensions of some of the elements in the figure may be exaggerated relative to other elements to help improve the understanding of the embodiments of the present disclosure.

DESCRIPTION OF THE PREFERRED EMBODIMENTS

In the framework of the disclosure, the following terms have the meaning indicated herein below.

The term "optical lens" is to be understood to mean any type of known lens intended to be positioned in front of the eye of a wearer. The term can refer to ophthalmic lenses such as non-corrective lenses, semi-finished lens blanks and corrective lenses, such as progressive addition lenses, unifocal or multifocal lenses. The term can also refer to said ophthalmic lenses which could present at least one added value such as, for example, tint, polarization filtering, electrochromism, antireflective properties, anti-scratch properties or comprise a photochromic unit or a light guide unit, . . .

The term "semi-finished optical lens" is to be understood to mean any type of known optical lens having two opposite surfaces at least one of which is unfinished.

The term "prescription" is to be understood to mean a set of optical characteristics comprising at least the optical power (sphere and cylinder) and eventually astigmatism, prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism at the distance-vision point and, where appropriate, an addition value. The prescription data may include data for emmetrope eyes.

Unless specifically stated otherwise, as apparent from the following discussions, it is appreciated that throughout the specification discussions utilizing terms such as "determining", "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present disclosure may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays referred herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present disclosure are not described with reference to any particular programming language. It will be appreciated that a variety of programming languages may be used to implement the teachings of the disclosure.

The disclosure relates to a method, for example implemented by computer means, for optimizing a geometrical parameter of at least one semi-finished optical lens in a set of semi-finished optical lenses having a designated lens material with a designated refractive index, for example from 1.50 to 1.74.

All the optical lenses of the set of semi-finished optical lenses comprise a face having a same curvature and all the semi-finished optical lens comprised in the set of semi-finished optical lens have a finished surface with a geometrical center reference point and an unfinished surface. The finished surface of the all the semi-finished optical lens of the set of semi-finished optical lens preferably has the same curvature. Each of the semi-finished optical lenses in the set of semi-finished optical lenses has a determined geometry determined to allow for said set of semi-finished optical lenses to manufacture finished optical lenses for substantially all ophthalmic lens prescriptions, for example for ophthalmic prescriptions with Sphere in the range of −8 D to 8 D and a Cylinder in the range of 0D to 6D.

It will be appreciated that extreme outlier ophthalmic prescriptions, such as clinical rarities, are manufactured as special cases using very large semi-finished optical lenses, and are not considered part of the "standard range population"; that is, substantially all ophthalmic lens prescriptions.

As illustrated on FIG. 1, the semi-finished optical lens 10 to be optimized has a first optical surface 12, a second optical surface 14 and an external periphery surface 16 connecting the first 12 and second 14 optical surfaces.

It will be appreciated by those persons skilled in the art that the first and/or second surfaces can be spherical, aspherical and/or progressive surfaces. It will also be appreciated that the determined geometries of the lenses in the set differ with different designated refractive indexes; for example, lenses with a refractive index of 1.57 are thinner than those with a refractive index of 1.53.

The semi-finished optical lens 10 to be optimized has a designated base curve and an initially determined geometry determined to allow manufacturing finished ophthalmic lenses for an initial set of ophthalmic prescriptions.

The base curves, on semi-finished optical lenses, provide surface power for the first surface, for example the front surface, which, when combined with the second surface, for example the back surface, facing a wearer's eye when mounted in a spectacle frame and worn by the wearer, after it is ground and polished, produces the desired dioptric function.

Figure 2:
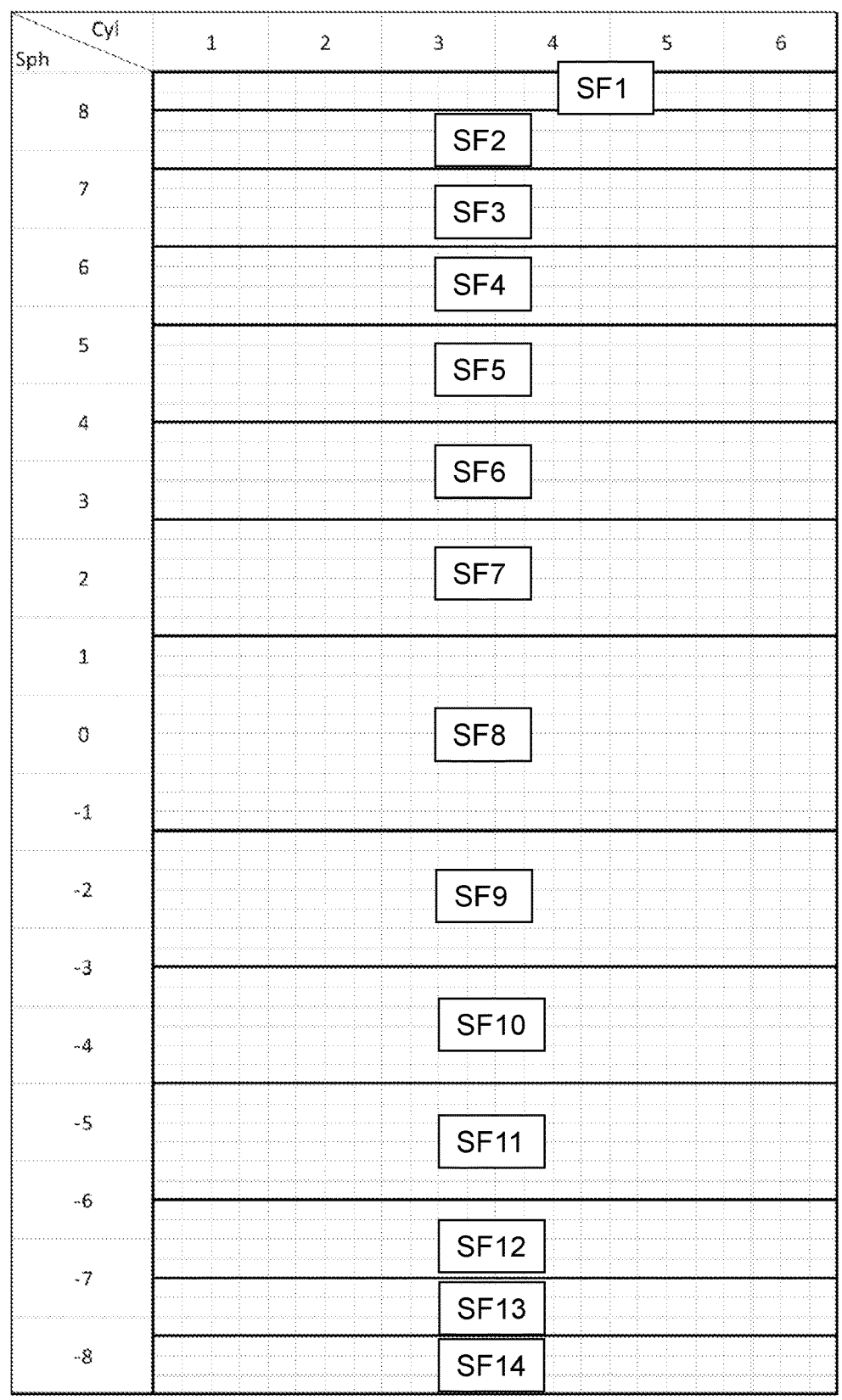
FIG. 2 represents a prescription data distribution per base curve of semi-finished ophthalmic lenses in an initial set.

FIG. 2 shows an example of a of representation of prescription data with sphere power on the y axis and cylinder power on the x axis.

It is shown in FIG. 2 that a set of semi-finished optical lenses for a designated lens material with different base curves practically covers a whole range of ophthalmic prescriptions, in the example of FIG. 2 sphere from −8.5 D to 8.5 D and cylinder from 0 D to 6 D. In the example of FIG. 2, different semi-finished optical lenses correspond to different ophthalmic prescriptions, however, one may have two or more different semi-finished optical lenses for a given ophthalmic prescription. In other words, two different semi-finished optical lenses may correspond to a same ophthalmic prescription.

The set of semi-finished optical lenses has an initially determined geometry for each semi-finished optical lens including a number of different base curves to cover the range of ophthalmic prescription. A person skilled in the art understands that the different base curve delimitations represented on FIG. 2 are purely for explanatory purposes and do not necessarily represent actual base curve delimitations. Delineations may, for example, be based on additional parameters such as addition power, prism power, decentration and diameter requirements. According to further embodiments, each lens of the set of semi-finished optical lenses has an initially determined thickness at the periphery of the semi-finished optical lens and/or an initially determined thickness at the center of the semi-finished optical lens, and/or an initially determined diameter and/or an initially determined curvature, for example the curvature of the back surface of the semi-finished optical lens. According to an embodiment, the determination of the optimized value of at least one geometrical parameter of an optimized semi-finished optical lens may comprise determining, for example calculating, a global cost function comprising:

a supply cost function,
a semi-finished lens cost function, and
a material cost function.

The supply cost function is a function of the number of different semi-finished optical lenses comprised in the set of semi-finished optical lenses. The semi-finished lens cost function is a function of the price of the semi-finished optical lenses comprised in the set of semi-finished optical lens. The material cost function is a function of the quantity of material to be removed from a semi-finished optical lens so as to provide an optical lens adapted to the provided data. The global cost function does not exclude any of the cost functions mentioned above as it is specified that each of the weights of the global cost function is different from zero.

The forecast of optical lenses may be obtained according to previously manufactured optical lenses or to new type of optical lenses the manufacturer may have to manufacture.

The set of semi-finished optical lenses considered in the optimization method of the invention may correspond to the optical lenses manufactured by a lens manufacturer over a past period of time, for example between one month and one year before the optimization.

The different lens of the set of semi-finished optical lens may have different thickness, at the center and or at the periphery of the lens.

The number of semi-finished lenses may be limited, for example to three different set of semi-finished lenses.

According to an embodiment, compared to the semi-finished lens from which it is determined, the optimized lens has the same base curve and has at least a different parameter comprising central thickness, periphery thickness, curvature of the rear face, diameter.

In the example shown in FIG. 2, there are 14 different determined base curves of semi-finished optical lenses SF1 to SF14 in the set of semi-finished optical lenses which are determined to substantially cover all prescriptions. These base curves can be determined using existing base curve selection charts.

The method of the disclosure allows to optimize a geometrical parameter of at least one semi-finished optical lens, for example the semi-finished optical lens SF8 on FIG. 2. A person skilled in the art understands that the method of the invention may be implemented for a plurality of determined base curves of semi-finished optical lenses so as to optimize the overall set of semi-finished optical lenses.

The initially determined geometry of the semi-finished optical lens SF8 is determined to allow manufacturing finished ophthalmic lenses for an initial set of ophthalmic parameters, for example ophthalmic prescription with a sphere greater than or equal to −1.25 D and smaller than or equal to 1.25 D and a cylinder greater than or equal to 0D and smaller than or equal to 6 D.

According to an embodiment of the disclosure, the initial set of ophthalmic parameters comprise a set of discrete values of ophthalmic parameters and for each ophthalmic parameter the initial set comprises all the discrete values comprised between two extreme values. For example, the initial set of ophthalmic parameters comprise a set of discrete values of prescription parameters and for each prescription parameter the initial set comprises all the discrete values comprised between two extreme values, for example sphere and cylinder and/or sphere and cylinder and diameter.

The set of discrete values of prescription parameters may have an increment greater than or equal to 0.05 diopter, for example greater than or equal to 0.1 diopter, and smaller than or equal to 0.5 diopter, for example smaller than or equal to 0.25 diopter.

As illustrated on FIG. 2, the initial set of ophthalmic parameters may comprise at least a plurality of ophthalmic prescriptions with a cylinder smaller than or equal to 0.1 diopter in absolute value, for example equal to 0 diopter.

Figure 3:
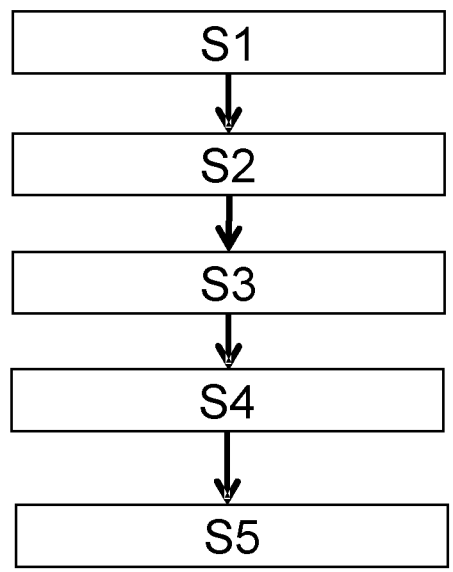
FIG. 3 is a flowchart of a method according to the disclosure.

As illustrated on FIG. 3, the method according to the disclosure comprises at least:
- an order proportion data providing step S1,
- a desired proportion selection rate providing step S2,
- a subset of ophthalmic parameters determining step S3,
- an optimized geometrical parameter determining step S4, and
- an outputting step S5.

During the order proportion data providing S1, order proportion data indicative of the proportion of each ophthalmic parameter, for example each ophthalmic prescription in the initial set of ophthalmic parameters is provided.

The order proportion data may be discrete values when the initial set of ophthalmic parameters comprises a set of discrete data.

The initial set of ophthalmic parameters may be expressed as a continuous function and thus the order proportion data may further be expressed as a continuous function.

In the example illustrated on FIG. 2, the initial set of ophthalmic parameters comprises a set of discrete value of prescription in sphere and cylinder and the order proportion data may be expressed as a proportion for each pair of sphere and cylinder values.

The order proportion data are typically determined based on past orders. To increase the accuracy of the method of the disclosure, it is best to have order proportion data based on a large number of past orders, for example at least 20000 orders.

During the desired proportion selection rate providing step S2, a desired proportion selection rate is provided. The desired proportion selection rate corresponds to the target of proportion of orders within the initial set of ophthalmic parameters, for example prescription parameters, that may be manufactured from the optimized semi-finished optical lens.

The term desired proportion selection rate refers to a predefined target value, for example 80%, representing the portion of total ophthalmic prescriptions in the initial dataset that the optimized semi-finished optical lens is intended to cover. This value is used as an input in determining the subset of prescriptions for optimization.

The desired proportion selection rate is a predefined numerical target, expressed as a percentage, representing a target proportion of the initial set of ophthalmic prescription parameters for which the optimized semi-finished optical lens allows manufacturing of finished lenses.

For example, the desired proportion selection rate is greater than or equal to 50%, for example greater than or equal to 60% and smaller than or equal to 95%, for example smaller than or equal to 80%.

A target proportion rate of 80% means that the optimized semi-finished optical lens should allow to manufacture finished ophthalmic lenses that for 80% of the initial set of ophthalmic parameters, for example the initial set of ophthalmic prescriptions.

During the subset of ophthalmic parameters determining step S3, a subset of ophthalmic parameters included in the initial set of ophthalmic parameters that corresponds to the provided desired proportion selection rate is determined based on the order proportion data. For example, during the subset of ophthalmic parameters determining step S3 a subset of ophthalmic prescriptions included in the initial set of ophthalmic prescription is determined.

As for the initial set of ophthalmic parameters, the subset of ophthalmic parameters may be expressed as a set of discrete values or as a continuous function.

According to an embodiment of the disclosure, the subset of ophthalmic parameters is expressed in the same way as the initial set of ophthalmic parameters.

Typically, the initial set of ophthalmic parameters and subset of ophthalmic parameters comprise a set of discrete values of prescription parameters and for each prescription parameter the initial set comprises all the discrete values comprised between two extreme values, for example sphere and cylinder and/or sphere and cylinder and diameter.

According to an embodiment of the disclosure the set of discrete values of prescription parameters in the initial set of ophthalmic parameters and in the subset of ophthalmic parameters have the same increment, for example greater than or equal to 0.05 diopter, for example greater than or equal to 0.1 diopter, and smaller than or equal to 0.5 diopter, for example smaller than or equal to 0.25 diopter.

According to an embodiment of the disclosure, the initial set of ophthalmic parameters comprises at least a plurality of ophthalmic prescriptions with a cylinder smaller than or equal to 0.1 diopter in absolute value, for example equal to 0 diopter and the subset of ophthalmic parameters comprises at least a plurality of ophthalmic prescriptions with a cylinder smaller than or equal to 0.1 diopter in absolute value, for example equal to 0 diopter.

Preferably, the subset of ophthalmic parameters is a joint set of discrete values of ophthalmic parameters, for example of ophthalmic prescriptions.

According to an embodiment of the disclosure, during the subset determining step the smallest subset of ophthalmic parameters that corresponds to the provided desired proportion selection rate, is determined. The smallest subset is to be understood as having the smallest surface in a two dimension representation of the ophthalmic parameters or the smallest volume in a three dimension representation of the ophthalmic parameters.

Alternatively, or in combination, the subset of ophthalmic parameters may be the smallest subset of ophthalmic parameters comprising one of the initial set limits.

If a plurality of subsets of ophthalmic parameters may be determined the skilled person may select one of the plurality of subsets based either on its experience or randomly.

According to an embodiment of the disclosure the subset of ophthalmic parameters corresponds to a uniform scaling of the initial set of ophthalmic parameters in a two-dimensions representation of the ophthalmic parameters.

For example, the subset of ophthalmic prescription corresponds to a uniform scaling of the initial set of ophthalmic prescription in a two-dimensions representation of the ophthalmic prescription, for example a sphere and cylinder representation.

During the optimized geometrical parameter determining step S4, at least one geometrical parameter of an optimized semi-finished optical lens is determined. The optimized semi-finished optical lens has the designated base curve and the designated lens material and allows manufacturing finished ophthalmic lenses for each ophthalmic prescriptions comprised in the subset of ophthalmic parameters.

According to an embodiment of the disclosure, the optimized semi-finished optical lens has an overall volume smaller than the overall volume of the semi-finished optical lens to be optimized. Advantageously, the optimized semi-finished optical lens allows reducing waste when manufacturing ophthalmic lenses. Indeed, the method of the disclosure allows optimizing the volume of the semi-finished optical lens for a desired proportion selection rate.

The geometrical parameter of the semi-finished optical lens to be optimized may be at least one of:
the diameter of the semi-finished optical lens,
the thickness at the center of the semi-finished optical lens,
the thickness at the periphery of the semi-finished optical lens,
the shape of the back surface of the semi-finished optical lens, for example the curvature of the back surface of the semi-finished optical lens.

The optimized geometrical parameter determining step S4 may be implemented using an optimization algorithm. Typically, the algorithm identifies iteratively the optimized value of at least one geometrical parameter based on the constraint explained earlier. It will be appreciated by those persons skilled in the art that the algorithm may solve linear and non-linear optimization problems. The skilled person may select and configure an algorithm to implement the optimized geometrical parameter determining step.

During the outputting step S5 the determined optimized value of the least one geometrical parameter of the optimized semi-finished optical lens is output as the optimized geometrical parameter of said semi-finished optical lens.

According to an embodiment of the disclosure, the determined optimized value of the least one geometrical parameter of the optimized semi-finished optical lens is output together with the corresponding subset of ophthalmic parameters, for example corresponding subset of ophthalmic prescriptions.

The output may be a new representation of the set of ophthalmic parameters where the initial subset is subdivided and the corresponding initial semi-finished optical lens and optimized semi-finished optical lens are displayed. An example is provided in FIG. 4 where an optimized semi-finished optical lens OSF10 and a corresponding subset of ophthalmic parameters have been determined for the semi-finished SF10.

As described previously, during the subset of ophthalmic parameters determining step S3 one may find a plurality of subsets of ophthalmic parameters included in the initial set of ophthalmic parameters and that correspond to the desired proportion selection rate.

According to an embodiment of the disclosure, the steps of determining a subset of ophthalmic parameters and determining the optimized value of at least one geometrical parameter are repeated so as to determine the subset of ophthalmic parameters that allows an optimized semi-finished optical lens having the smallest overall volume.

In other words, the method according to the disclosure may comprise an iterative repetition of the steps of determining a subset of ophthalmic parameters and determining the optimized value of at least one geometrical parameter to minimize the overall volume of the optimized semi-finished optical lens. Advantageously, the method of the disclosure allows determining the smallest, in volume, semi-finished optical lens that allows reaching a proportion rate of at least the desired proportion rate over the initial set of ophthalmic parameters.

At least part of the geometrical parameters of the optimized semi-finished optical lens are determined by specific ophthalmic parameters within the subset of ophthalmic parameters.

Figure 4:
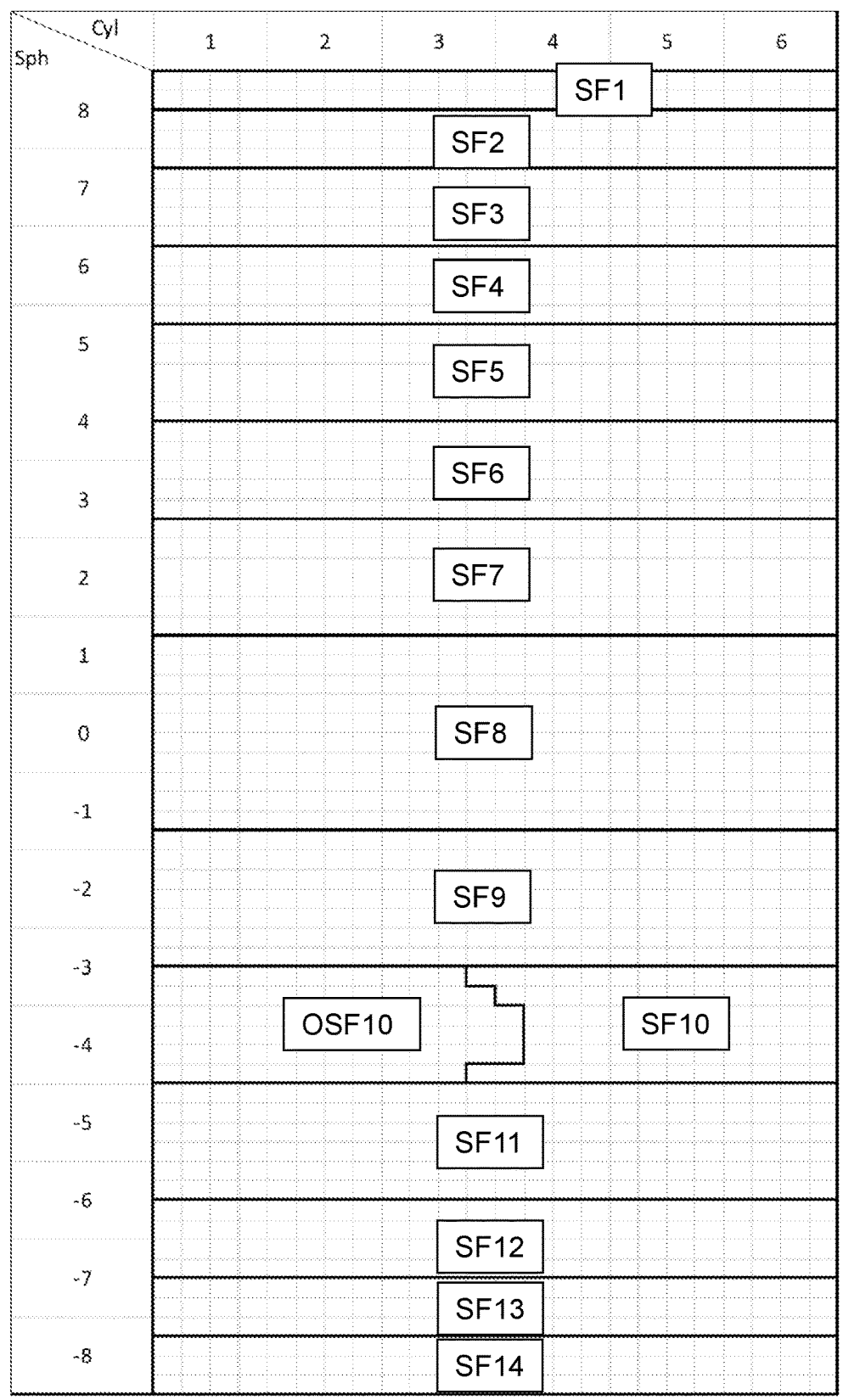
FIG. 4 represents a prescription data distribution per base curve of semi-finished ophthalmic lenses in an optimized set according to the disclosure.

For example, on FIG. 4, the thickness at the periphery of the semi-finished optical lens OSF10 is determined by the ophthalmic prescription with the smallest cylinder, closer to 0 D, and the greatest sphere in absolute value, at −4.5 D.

The values of the ophthalmic parameters within the subset of ophthalmic parameters that have the greatest impact on the at least one geometrical parameter of the optimized semi-finished optical lens are referred to as constrained ophthalmic parameters.

According to an embodiment of the disclosure, the steps of determining a subset of ophthalmic parameters and determining the optimized value of at least one geometrical parameter are repeated so as to determine an optimized subset of ophthalmic parameters that corresponds to the provided desired proportion selection rate.

When repeating the steps of determining a subset of ophthalmic parameters and determining the optimized value of at least one geometrical parameter, the new subset of ophthalmic parameters corresponds to the previously determined subset of ophthalmic parameters from which the constrained ophthalmic parameters have been removed and replaced by the values of optical parameters that have a smaller impact on the at least one geometrical parameter of the optimized semi-finished optical lens.

For example, on FIG. 4, the new subset of ophthalmic parameters corresponding to OSF10 may exclude the ophthalmic prescription with a cylinder of 0 D, and a sphere of −4.5 D and include exclude the ophthalmic prescription with a cylinder of 3 D, and a sphere of −3 D.

It will be appreciated by those persons skilled in the art that the skilled person determines the constrained ophthalmic parameters according to the different possible subset of ophthalmic parameters.

When implementing the method of the disclosure the effective proportion selection rate of the subset of ophthalmic parameters associated with the optimized semi-finished optical lens may be greater than the desired proportion rate. Therefore, it may be possible to increase the optimization of the geometrical parameters of the semi-finished optical lens while having an effective proportion selection rate closer to desired proportion selection rate.

According to an embodiment of the disclosure, after having determined the optimized semi-finished optical lens an effective proportion selection rate for said optimized semi-finished optical lens is determined based on the provided order proportion data.

The effective proportion selection rate may be compared to the provided desired proportion selection rate.

The steps of determining a subset of ophthalmic parameters and determining the optimized value of at least one geometrical parameter are repeated using a smaller desired proportion selection rate.

The effective proportion selection rate may be further determined and compared to the desired proportion selection rate.

Advantageously, such embodiment allows optimizing the semi-finished optical lens while having an effective proportion selection as close as possible to the desired proportion selection.

According to an embodiment of the disclosure, the method may include repeating the steps S1 to S4 with a different desired proportion selection rate, where at each repetition the difference in volume of the optimized semi-finished optical lens and the initial semi-finished optical lens is determined. The method further comprises determined the proportion rate and optimized semi-finished optical lens that provide the greatest difference in volume.

Figure 5:
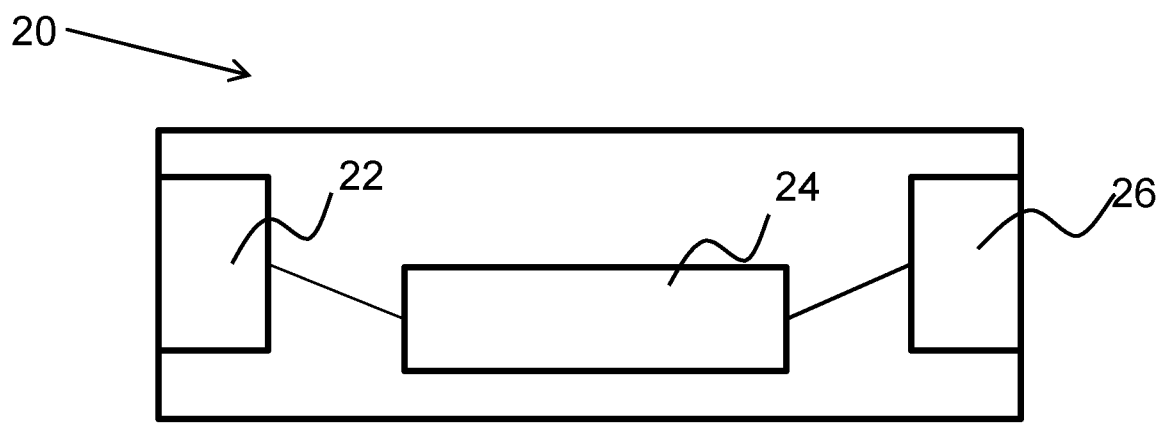
FIG. 5 represents a data processing device according to the disclosure.

As represented on FIG. 5, the disclosure further relates to a data processing device 20 comprising at least:
one input 22,
one processor 24, and
an output 26.

The data processing device is configured for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters.

The input device 22 is configured at least for:
obtaining order proportion data indicative of the proportion of each ophthalmic prescription in the initial set of ophthalmic parameters, and
obtaining a desired proportion selection rate.

The processor 24 is configured at least for:
determining a subset of ophthalmic parameters included in the initial set of ophthalmic parameters that corresponds to the provided desired proportion selection rate based on the order proportion data, and
determining the optimized value of at least one geometrical parameter of an optimized semi-finished optical lens, the optimized semi-finished optical lens having the designated base curve and lens material and allows manufacturing finished ophthalmic lenses for each ophthalmic prescriptions comprised in the subset of ophthalmic parameters, wherein the optimized semi-finished optical lens has an overall volume smaller than the overall volume of the semi-finished optical lens to be optimized.

The data processing device may further include a memory for storing at least instructions to which the processor 24 has access to implement the determining steps of the method of the disclosure.

The output 26 is configured at least for outputting the determined optimized value of the least one geometrical parameter of the optimized semi-finished optical lens as the optimized geometrical parameter of said semi-finished optical lens.

The data processing device 20 may comprise the input, processor and output in a same location, such as in a same computing device.

In a further embodiment the processor 24 may reside on a distant server accessible over a network, such as the Internet, by a suitable data link. Accordingly, the server receives and transmits data over the network with any number of connected computing devices. The server may also include a memory, in addition to the processor, for storing instructions to implement the processor to perform the determination steps of at least one of the methods of the disclosure.

The description made for the method aspect of the disclosure also applies to the data processing device aspect of the disclosure in particular concerning the initial set of ophthalmic parameters, the subset of ophthalmic parameters, the order proportion data and the desired proportion selection rate, the geometrical parameters and the optimized semi-finished optical lens.

The disclosure has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method for optimizing a geometrical parameter of at least one semi-finished optical lens in a set of semi-finished optical lenses having a designated lens material, the semi-finished optical lens to be optimized having a designated base curve and an initially determined geometry determined to allow manufacturing finished ophthalmic lenses for an initial set of ophthalmic parameters, the method comprising:
providing order proportion data indicative of the proportion of each ophthalmic prescription in the initial set of ophthalmic parameters;
providing a desired proportion selection rate;
determining a subset of ophthalmic parameters included in the initial set of ophthalmic parameters that corresponds to the provided desired proportion selection rate based on the order proportion data;
determining the optimized value of at least one geometrical parameter of an optimized semi-finished optical lens, the optimized semi-finished optical lens having the designated base curve and the designated lens material and allows manufacturing finished ophthalmic lenses for each ophthalmic prescriptions comprised in the subset of ophthalmic parameters; and outputting the determined optimized value of the least one geometrical parameter of the optimized semi-finished optical lens as the optimized geometrical parameter of said semi-finished optical lens, wherein the desired proportion selection rate is a predefined numeral target, expressed as a percentage, representing a target proportion of the initial set of ophthalmic prescription parameters for which the optimized semi-finished optical lens allows manufacturing of finished lenses.

2. The method according to claim 1, wherein the initial set of ophthalmic parameters and subset of ophthalmic parameters comprise a set of discrete values of prescription parameters and for each prescription parameter the initial set comprises all the discrete values comprised between two extreme values.

3. The method according to claim 2, wherein the set of discrete values of prescription parameters have an increment greater than or equal to 0.05 diopter and smaller than or equal to 0.5 diopter.

4. The method according to claim 2, wherein the initial set of ophthalmic parameters comprises at least a plurality of ophthalmic prescriptions with a cylinder smaller than or equal to 0.1 diopter in absolute value.

5. The method according to claim 4, wherein the subset of ophthalmic parameters comprises at least a plurality of ophthalmic prescriptions with a cylinder smaller than or equal to 0.1 diopter in absolute value.

6. The method according to claim 1, wherein the subset of ophthalmic parameters corresponds to a uniform scaling of the initial set of ophthalmic parameters in a two-dimensions representation of the ophthalmic prescription parameters.

7. The method according to claim 1, wherein the geometrical parameter is at least one of:
the diameter of the semi-finished optical lens,
the thickness at the center of the semi-finished optical lens,
the thickness at the periphery of the semi-finished optical lens, and
the shape of the back surface of the semi-finished optical lens.

8. The method according to claim 1, wherein the desired proportion selection rate is greater than or equal to 50% and smaller than or equal to 95%.

9. The method according to claim 2, wherein upon determining the subset of ophthalmic parameters that corresponds to the provided desired proportion selection rate, the smallest subset of ophthalmic parameters is determined.

10. The method according to claim 1, wherein the determining the subset of ophthalmic parameters and determining the optimized value of at least one geometrical parameter are repeated to determine the subset of ophthalmic parameters that allows an optimized semi-finished optical lens having the smallest overall volume.

11. The method according to claim 1, wherein after having determined the optimized semi-finished optical lens an effective proportion selection rate for said optimized semi-finished optical lens is determined based on the provided order proportion data,
the effective proportion selection rate is compared to the provided desired proportion selection rate, and the determining the subset of ophthalmic parameters and determining the optimized value of at least one geometrical parameter are repeated using a smaller desired proportion selection rate.

12. A method for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters, the method comprising:
repeating the method according to claim 1 with a different desired proportion selection rate, where at each repetition the difference in volume of the optimized semi-finished optical lens and the initial semi-finished optical lens is determined; and
determining the proportion rate and the optimized semi-finished optical lens that provide the greatest difference in volume.

13. A data processing device for optimizing a geometrical parameter of at least one semi-finished optical lens in a set of semi-finished optical lenses having a designated lens material, the semi-finished optical lens to be optimized has a designated base curve and an initially determined geometry determined to allow manufacturing finished ophthalmic lenses for an initial set of ophthalmic parameters, the device comprising:
at least one input configured to:
obtain order proportion data indicative of the proportion of each ophthalmic prescription in the initial set of ophthalmic parameters, and
obtain a desired proportion selection rate;
at least one processor configured to:
determine a subset of ophthalmic parameters included in the initial set of ophthalmic parameters that corresponds to the provided desired proportion selection rate based on the order proportion data, and
determine the optimized value of at least one geometrical parameter of an optimized semi-finished optical lens, the optimized semi-finished optical lens having the designated base curve and lens material and allows manufacturing finished ophthalmic lenses for each ophthalmic prescriptions comprised in the subset of ophthalmic parameters, the optimized semi-finished optical lens having an overall volume smaller than the overall volume of the semi-finished optical lens to be optimized; and
at least an output configured to:
outputting the determined optimized value of the least one geometrical parameter of the optimized semi-finished optical lens as the optimized geometrical parameter of said semi-finished optical lens,
wherein the desired proportion selection rate is a predefined numeral target, expressed as a percentage, representing a target proportion of the initial set of ophthalmic prescription parameters for which the optimized semi-finished optical lens allows manufacturing of finished lenses.

14. A computer-readable storage medium comprising instructions which, when executed by a computer, cause the computer to carry out the steps of claim 1.

15. The method according to claim 2, wherein the set of discrete values of prescription parameters have an increment greater than or equal to 0.1 diopter, and smaller than or equal to 0.25 diopter.

16. The method according to claim 2, wherein the initial set of ophthalmic parameters comprises at least a plurality of ophthalmic prescriptions with a cylinder equal to 0 diopter.

17. The method according to claim 4, wherein the subset of ophthalmic parameters comprises at least a plurality of ophthalmic prescriptions with a cylinder equal to 0 diopter.

18. The method according to claim 1, wherein the subset of ophthalmic parameters corresponds to a uniform scaling of the initial set of ophthalmic parameters in sphere and cylinder representation of the ophthalmic prescription parameters.

19. The method according to claim 1, wherein the desired proportion selection rate is greater than or equal to 60% and smaller than or equal to 80%.

20. The method according to claim 3, wherein the initial set of ophthalmic parameters comprises at least a plurality of ophthalmic prescriptions with a cylinder smaller than or equal to 0.1 diopter in absolute value.

\* \* \* \* \*